Feb. 2, 1926.

R. GRETSCH 1,571,264

VEHICLE STABILIZER

Filed Oct. 23, 1925

WITNESSES:
C.J. Weller.
S M Pineles

INVENTOR
Rudolf Gretsch.
BY
Wesley G. Carr
ATTORNEY

Patented Feb. 2, 1926.

1,571,264

UNITED STATES PATENT OFFICE.

RUDOLF GRETSCH, OF BERLIN-GRUNEWALD, GERMANY, ASSIGNOR TO WESTINGHOUSE ELECTRIC & MANUFACTURING COMPANY, A CORPORATION OF PENNSYLVANIA.

VEHICLE STABILIZER.

Application filed October 23, 1925. Serial No. 64,381.

*To all whom it may concern:*

Be it known that I, RUDOLF GRETSCH, a citizen of the German Empire, and a resident of Berlin-Grunewald, Germany, have invented a new and useful Improvement in Vehicle Stabilizers, of which the following is a specification.

My invention relates to stabilizers for vehicles or similar devices that are exposed to disturbing forces tending to cause rolling or oscillation of the same, and it has particular relation to stabilizers utilizing flywheels rotating on axes which are parallel to the direction of the impressed oscillations as distinguished from axes at right angles as is common in gyroscopic stabilizers.

One object of my invention is to provide an improved stabilizing system of the above described character wherein maximum stabilizing action is obtained efficiently and with a minimum loss of energy.

A further object of my invention is to provide a stabilizing system employing two oppositely rotating flywheel masses and utilizing the reactive forces obtained by retarding one flywheel mass and simultaneously accelerating the other flywheel mass for counteracting impressed external disturbing forces.

A still further object of my invention are means and methods for utilizing the energy derived from retarding one of the flywheels, of the above described stabilizing system, for accelerating the other flywheel.

According to my invention, two flywheels rotating oppositely around axes parallel to the axis of the impressed oscillation are mounted upon the vehicle to be stabilized. The external forces tending to oscillate the vehicle are opposed by reactive couples obtained by retarding the flywheel which is rotating in the direction opposite to the direction of the impressed oscillation and by accelerating the flywheel which is rotating in the direction of the impressed force. In the preferred form of my invention, the energy obtained by retarding one of the flywheels is directly utilized to accelerate the second flywheel.

The foregoing and other objects of my invention will be best understood by reference to the accompanying drawings, wherein—

Figure 1:
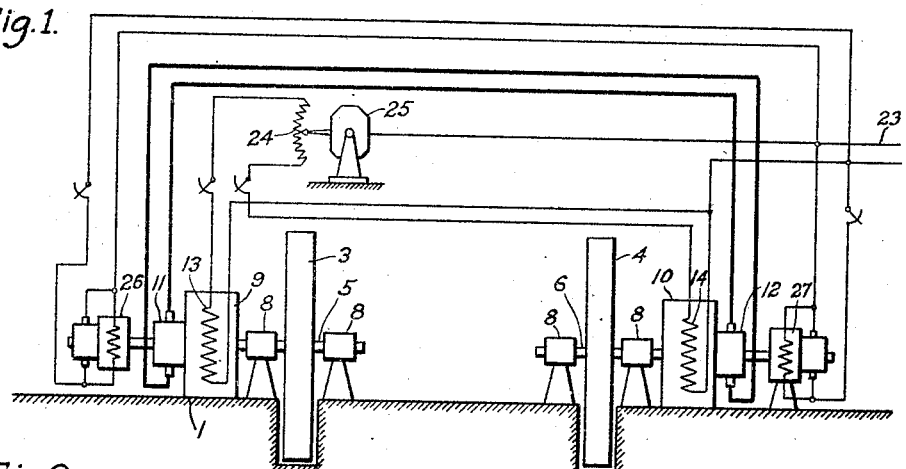
Figure 1 is a diagrammatic view of a stabilizing system embodying my invention.
Figure 2:
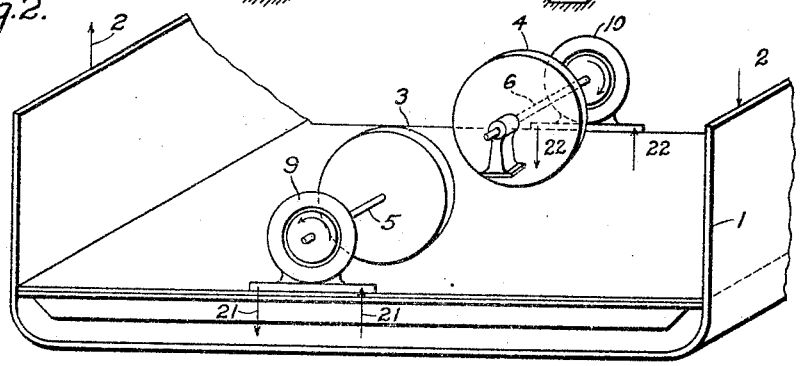
Fig. 2 is a diagrammatic perspective view of stabilizing apparatus showing the operation of the forces producing the stabilizing action.

Referring to Figs. 1 and 2, a vehicle, such as a ship 1, is exposed to externally impressed forces 2 tending to oscillate the same around its longitudinal axis. In order to offset the action of the external forces 2 and prevent the oscillation of the vehicle around the above-mentioned axis, two flywheels 3 and 4 are mounted on shafts 5 and 6 which are disposed parallel to the axis of the impressed oscillation of forces 2. Each of the shafts 5 and 6 is supported on two bearings 8. The shafts are coupled, respectively, to dynamo-electric machines 9 and 10, which are rigidly mounted upon the body of the ship 1. While my invention is not limited to any particular type of dynamo-electric machines 9 and 10, I have shown them in the form of direct-current machines having armatures provided with commutators 11, 12 and stators having field windings 13, 14, respectively.

In accordance with my invention, the two dynamo-electric machines 9 and 10 are so connected and operated that when the vehicle is in a stable condition, that is, when no external forces are acting upon the same, the two flywheels are rotated in opposite directions at relatively great velocity, each rotating flywheel representing a relatively great kinetic energy, and no power is being transmitted between the dynamo-electric machines 9 and 10 and the respective flywheels 3 and 4.

However, when an external couple 2 tends to cause rotation or oscillation of the ship, the two dynamo-electric machines are to be so operated that the flywheel 3, which rotates in the direction opposite to the direction of the external forces 2, is retarded, and a part of its kinetic energy is transformed, in the associated dynamo-electric machine 9, into electric current which is supplied to the other dynamo-electric machine 10. The latter, in turn, drives its associated flywheel 4 in the direction of the external forces 2 and thus produces acceleration. The reactive forces designated by arrows 21 and 22, which are transmitted by the two dynamo-electric machines 9 and 10 to the body of the ship, will then be of such character as to counteract the external forces 2 which tend to produce the oscillation, thus securing stabilization of the ship.

The operation of the forces involved in the stabilizing action may be followed from Fig. 2, wherein the dynamo-electric machine 9, which acts as a generator, reacts upon the foundation with a torque couple 21 in the direction of the rotation of the associated flywheel 3, while the dynamo-electric machine 10, which acts as a motor, reacts upon the foundation with torque couple 22 opposite to the direction of rotation of its associated flywheel 4. It will be observed that both of the torque couples 21 and 22 are in opposition to the external force couple 2.

Various types of dynamo-electric machines and connections between the same may be employed for obtaining the action just described. In the embodiment of my invention shown in Fig. 1, the commutators 11 and 12 of the two dynamo-electric machines 9 and 10 are permanently connected together, and the field windings 13 and 14 are supplied from an auxiliary direct-current line 23 through a differential-type rheostat 24, so as to increase the excitation of the machine intended to operate as a generator and to decrease the excitation of the machine intended to operate as a motor. The field rheostat 24 is controlled by an auxiliary pilot gyroscope 25 or similar device responding to the slightest incipient rolling of the ship resulting from the action of external forces thereon.

In the stabilizing system described above, the reactive couples obtained by retarding and accelerating the two flywheels both act in the same direction, each contributing, in part, to offset the action of the external forces. By utilizing the energy derived from the retardation of one of the flywheels for the acceleration of the other flywheel, the total sum of the energies stored in the two flywheels remains practically the same and no substantial amount of energy need be externally supplied to the stabilizing unit.

In order to supply the losses incident to the rotation of the two flywheels, additional auxiliary dynamo-electric machines 26 and 27 may be mounted upon the shafts 5 and 6 of the two flywheels, these machines being shown connected to the direct-current line 23, which is also used for exciting the two main units 9 and 10. Sufficient energy is supplied through these auxiliary machines 26 and 27 to cover the losses occasioned by the rotation of the two flywheel units. During the stabilizing action, both of the auxiliary machines may be left in operation, as shown in Fig. 1, or connections may be arranged whereby the machine driving the flywheel which is being retarded at any instant may be temporarily disconnected from the line, so as to increase the retarding action as will be obvious.

While I have shown a system in Fig. 1, wherein the flywheels and the regulating dynamo-electric machines constitute separate units, I may embody the masses required for the flywheel action in the rotors of the dynamo-electric machines themselves. Such a construction is shown in Fig. 3, wherein the rotors 31, 32 have sufficient masses to produce the flywheel effect required for the stabilization of the ship.

Figure 3:
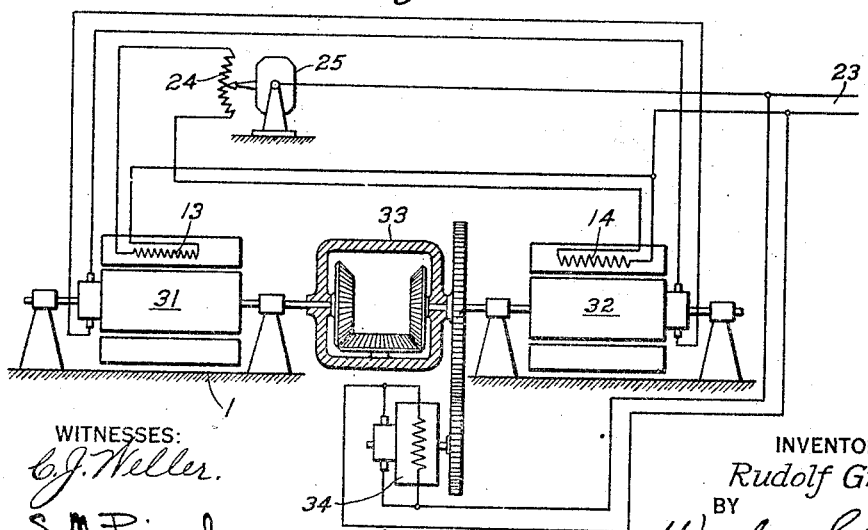
Fig. 3 is a view similar to Fig. 1, showing a modification of my invention.

In the system shown in Fig. 3, the energy required for compensating the losses incident to the rotation of the rotors is supplied by means of a differential driving connection 33 between the rotors 31 and 32, permitting rotation of the latter in opposite directions and at different speeds, the differential being driven by an auxiliary motor 34. With the arrangement just mentioned, the auxiliary driving motor 34 rotates continuously in the same direction with approximately constant speed, while the two main dynamo-electric units rotate in opposite direction with varying speeds depending upon the magnitude of the required stabilizing action. The auxiliary drive of the differential 34 should be so arranged as to avoid undesirable gyroscopic action.

I claim as my invention:

1. The combination with a vehicle exposed to forces tending to rotate the same, of a stabilizer therefor comprising two masses rotating in opposite directions around an axis parallel to the axis of rotation of said forces and means for retarding one of said masses and supplying the energy derived from the retardation to the other of said masses to accelerate the same.

2. In a vehicle exposed to forces tending to rotate the same around an axis, a stabilizer comprising two flywheel masses rotatable around axes parallel to said vehicle axis, means for rotating said masses in opposite directions, and energy-translating means rigid with respect to said vehicle for deriving energy from one of said flywheels and supplying said energy to the other of said flywheels.

3. The combination with a vehicle, of a stabilizer for said vehicle comprising two flywheels having parallel axes of rotation, means for rotating said flywheels in opposite directions, energy-translating means rigid with respect to said vehicle for deriving energy from one of said flywheels and supplying said energy to the other of said flywheels, and means responsive to the action of disturbing forces tending to oscillate said vehicle around an axis parallel to said axes for actuating said energy-translating device to produce an energy flow between said flywheels tending to produce stabilizing forces opposed to said disturbing forces.

4. The combination with a vehicle, of a stabilizer for said vehicle comprising two flywheels having parallel axes of rotation, energy-translating means rigidly mounted upon said vehicle for retarding one of said flywheels and supplying the derived energy to the other flywheel to accelerate the same, and control means responsive to disturbing forces tending to oscillate said body around an axis parallel to said axes for controlling the energy-flow between said flywheels, said control means causing retaradation of the flywheel rotating oppositely to the direction of the impressed oscillation and acceleration of the flywheel rotating in the direction of said oscillation.

5. The combination with a vehicle exposed to forces tending to rotate the same, of a stabilizer therefor comprising two masses rotating in opposite directions around axes parallel to the axis of rotation of said forces, and electrical translating means for retarding one of said masses and supplying the energy derived from the retardation to the other of said masses to accelerate the same.

6. In a vehicle exposed to forces tending to rotate the same around an axis, a stabilizer comprising two flywheel masses rotatable around axes parallel to said vehicle axis, means for rotating said masses in opposite directions, said masses rotating in opposite directions, dynamo-electric means associated with each of said masses, said dynamo-electric means having stationary members supported by said vehicle, means for causing one of said masses to drive the associated dynamo-electric means as a generator, and means for supplying the generated electric energy to the dynamo-electric means associated with the other of said masses to drive the same as a motor.

7. The combination with a vehicle, of a stabilizer for said vehicle comprising two flywheels having parallel axes of rotation, said flywheels rotating in opposite directions, dynamo-electric means supported by said vehicle and associated with each of said flywheels for retarding and accelerating the same, and means for simultaneously retarding one of said flywheels and accelerating the other of said flywheels.

8. The combination with a vehicle exposed to impressed forces tending to cause an oscillation of the vehicle around an axis, of a stabilizer therefor comprising two flywheels rotating oppositely around axes parallel to the axis of oscillation, and means for simultaneously retarding one of said flywheels and accelerating the other of said flywheels.

9. The combination with a vehicle exposed to impressed forces tending to cause an oscillation of the vehicle around an axis, of a stabilizer therefor comprising two flywheels rotating oppositely around axes parallel to the axis of oscillation, and means responsive to the action of said disturbing forces for retarding the flywheel rotating in a direction opposite to the impressed forces and for simultaneously accelerating the flywheel rotating in the direction of the impressed forces.

10. The combination with a vehicle exposed to impressed forces tending to cause an oscillation of the vehicle around an axis, of a stabilizer therefor comprising two flywheels rotating oppositely around axes parallel to the axis of oscillation, energy-translating means rigid with respect to said vehicle for deriving energy from one of said flywheels and supplying said energy to the other of said flywheels, and means for independently supplying to said flywheels the energy consumed by the losses incident to the rotation of the same.

11. The combination with a vehicle exposed to impressed forces tending to cause an oscillation of the vehicle around an axis, of a stabilizer therefor comprising two flywheels rotatable around axes parallel to the axis of oscillation, a differential driving connection between said flywheels causing rotation of the same in opposite directions and permitting different speeds of rotation for each flywheel, means for driving said differential connection to supply to said flywheels the energy required to overcome the losses incident to the rotation of the same, and energy-translating means rigid with respect to said vehicle for deriving energy from one of said flywheels and supplying said energy to the other of said flywheels.

12. The combination with a vehicle exposed to impressed forces tending to cause an oscillation of the vehicle around an axis, of a stabilizer therefor comprising two flywheels rotating oppositely around axes parallel to the axis of oscillation, means responsive to the action of said disturbing forces for retarding the flywheel rotating in a direction opposite to the impressed forces and for simultaneously accelerating the flywheel rotating in the direction of the impressed forces, and independent driving means for each of said flywheels overcoming the losses incident to the rotation of the same.

13. The method of stabilizing a vehicle exposed to disturbing forces tending to oscillate the same, by means of a stabilizer comprising two flywheel masses rotating in opposite directions around an axis parallel to the axis of oscillation, which comprises simultaneously retarding one of said masses and accelerating the other of said masses.

14. The method of stabilizing a vehicle exposed to disturbing forces tending to oscillate the same, by means of a stabilizer comprising two flywheel masses rotating in opposite directions around axes parallel to the axis of oscillation, and dynamo-electric means supported by said vehicle and associated with said flywheel masses, which comprises retarding the flywheel mass rotating oppositely to the direction of said forces by causing the associated dynamo-electric means to generate electrical energy and supplying the generated energy to the dynamo-electric means associated with the other of said masses to accelerate the same in the direction of the action of said forces.

In testimony wheerof, I have hereunto subscribed my name this 26th day of September, 1925.

RUDOLF GRETSCH.